May 17, 1938.  F. PORTER  2,117,359
PHTHALIC ANHYDRIDE PRODUCTION
Filed Aug. 17, 1937
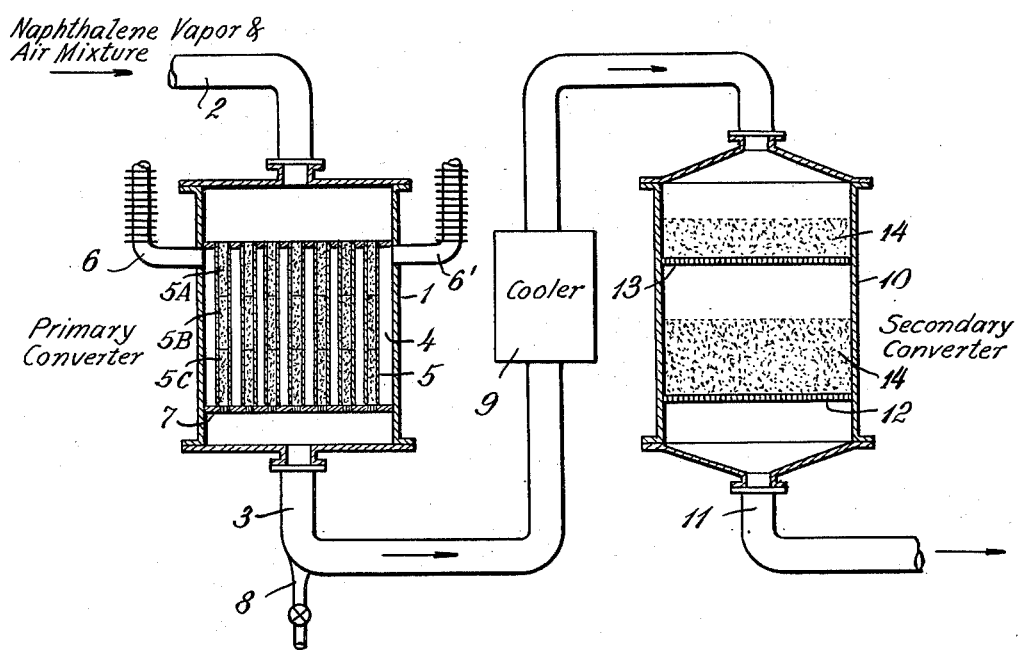
INVENTOR
Frank Porter
BY
ATTORNEY Patented May 17, 1938

2,117,359

UNITED STATES PATENT OFFICE 2,117,359

PHTHALIC ANHYDRIDE PRODUCTION

Frank Porter, Syracuse, N. Y., assignor to The Solvay Process Company, Syracuse, N. Y., a corporation of New York Application August 17, 1937, Serial No. 159,499

8 Claims. (Cl. 260—123)

This application is in part a continuation of my application Serial No. 759,972, filed December 31, 1934.

This invention relates to the catalytic oxidation of organic compounds to produce phthalic anhydride. In particular it is directed to a new method for obtaining increased yields of the desired oxidation product and for obtaining the product in a condition of greater purity than obtainable by the methods commonly employed.

In the catalytic oxidation of naphthalene a mixture of naphthalene vapor and a large excess of an oxidizing gas, e. g. air, is passed at an elevated temperature through a converter containing a catalyst bed composed of an oxidation catalyst distributed on a suitable carrier, for instance vanadium oxide on a crushed alundum carrier. The temperature in the converter is normally maintained between 450° and 600° C. and at these temperatures the conversion proceeds rapidly to phthalic anhydride.

The phthalic anhydride itself is subject to rapid oxidation at the high temperature of the converter and in order to avoid its excessive oxidation, it may be necessary to pass the gases from the converter while they yet contain products of a low degree of oxidation such as naphthoquinone and coumarin.

The presence of the lower oxidation products in the phthalic anhydride product is especially objectionable because they have physical characteristics similar to those of phthalic anhydride and their elimination from the reaction product presents further difficulties. Accordingly the most judicious choice is frequently a low yield of phthalic anhydride rather than the presence of even traces of naphthoquinone or coumarin.

The present invention has for its purpose the direct production of high yields of phthalic anhydride substantially free from lower oxidation products. It is also has as an object the more effective use of the oxidation catalyst materials and the more efficient control of the heat of reaction to effect this result.. Further objects will be apparent from the following description.

In the catalytic oxidation of naphthalene as normally carried out, the naphthalene vapor-air mixture containing on the order of 1 part by weight of naphthalene for each 25 to 35 parts by weight of air (representing a molar or volume ratio of from 1:110 to 1:160) is preheated and passed through a porous mass of the oxidation catalyst. Cooling means are generally provided to prevent rise of the reaction temperature above the desired maximum, for example 550° C. The hot gaseous reaction products are withdrawn from the converter and cooled to condense phthalic anhydride after which they are scrubbed to eliminate maleic anhydride, which also forms in small quantities, and are exhausted.

The improved process of the present invention is based upon my discovery that the high temperatures normally prevailing in the catalytic converter cause rapid oxidation of phthalic anhydride to products of complete oxidation, $CO_2$ and $H_2O$, but that this over-oxidation may be greatly reduced without corresponding reduction in the rate of oxidation of naphthoquinone and coumarin to phthalic anhydride if the further oxidation is conducted at temperatures between 370° and 410° C. These lower temperatures, however, inhibit oxidation of the naphthalene employed as an initial material and if the entire oxidation process were carried out at the lower temperatures, the benefit of the low rate of phthalic anhydride oxidation would be cancelled by the additional time required for oxidation of the hydrocarbon.

I have found that the benefits of my discovery may be obtained by oxidizing the naphthalene (by means of a gas containing molecular oxygen) while at a temperature above 425° C., for instance in a catalyst mass whose temperature in the hottest zone is between 450° and 550° C. and in the final zone is not less than 425° C., for a reaction period sufficient to partially oxidize substantially all of the hydrocarbon but insufficient to convert all of the intermediate products: naphthoquinone and coumarin, to phthalic anhydride (under the specific conditions mentioned a major part, normally at least 80%, of the naphthalene is oxidized at temperatures between 450° and 550° C., the balance being oxidized at temperatures between 425° and 450° C.); then adjusting the temperature of the reaction gases to between 350° and 410° C. and passing them, while maintaining this temperature, into contact with another oxidation catalyst mass, preferably a more active catalyst than used in the first step, to convert the intermediate products to phthalic anhydride (under these conditions a major part of the residual naphthoquinone is oxidized at less than 410° C. even though the temperature rise, during the last quarter of the contact period, to as high as 450° C., but preferably the catalyst is so distributed that 80% to 100% of this oxidation is effected below 410° C.).

Since a vanadium oxide catalyst (the catalyst employed commercially for conversion of naphthalene to phthalic anhydride) under the temperature conditions prevailing in the first step, causes more rapid oxidation of naphthoquinone to phthalic anhydride than of naphthalene to naphthoquinone, the reaction taking place in the first catalyst mass is a progressive one and as much as 93% to 98% of the total naphthoquinone oxidation may take place in this catalyst mass. Because of the relatively low temperature employed in the second step of the process, the catalytic effect required for oxidizing naphthoquinone in this step is usually substantially greater than that prevailing in the first step despite the fact that a much smaller proportion of the naphthoquinone oxidation is conducted in the later step. Consequently, when a catalyst of the above nature is employed, the size and activity of the catalyst mass used in the second oxidation step should be such that if it were substituted for the catalyst mass in the first step (under the temperature conditions therein prevailing), it would be capable of conversions of naphthoquinone to phthalic anhydride at least as great as actually occur in the catalyst for which it was substituted.

With catalysts of the vanadium oxide type I preferably employ a catalytic power in the second converter about twice as great as that in the first converter. Thus with catalysts of the same activity, I employ in the second converter a sufficient mass so that the time of reaction therein will be at least twice as long as in the first converter. Or if the time of contact is less than this, I correspondingly increase the activity of the catalyst.

In the conversion of naphthalene to phthalic anhydride and naphthoquinone most satisfactory conditions seem to lie within the range 425° C. to 500° C. with an optimum at about 475° C. but with an ordinary catalyst, especially one that has been used for some time, the reaction rate is undesirably low at the low end of this range. Thus the reaction rate constant at 425° C. is only about 2/7ths of that at 475° C. Accordingly, from the practical standpoint it is more desirable to permit variation above the optimum than below.

In considering the reaction rate it should be borne in mind that the amount of any one component consumed by oxidation depends upon its concentration as well as its reaction rate constant and that the concentration of each component changes constantly during the reaction.

In the conversion of the naphthoquinone to phthalic anhydride I have found that the yield of phthalic anhydride increases as the temperature decreases. However, with the customary vanadium oxide catalyst the reaction is too slow for convenient operation below 350° C. and practically temperatures lying between 370° and 410° C. should be used. Moreover, in the absence of cooling means, the temperature will rise during the oxidation. Normally the temperature rise amounts to 25° to 30° but it may be considerably more than this. Since operation without cooling means permits simplification of converter structure, such operation is of advantage from the structural standpoint. As a matter of fact, I have found that the temperature may rise in the secondary converter up to a maximum temperature of 450° C. without causing substantially lower yields of phthalic anhydride. This appears to be because such a temperature prevails for a relatively brief period. The rate of temperature rise in a converter devoid of cooling means is not a linear function of time but accelerates as the temperature rises so that it is slow for most of the oxidation period and increases sharply near the end thereof. If the reaction temperature in the secondary oxidation step is kept below 410° C. for at least 75% of this oxidation step, the temperature may rise above this temperature and up to 450° C. without nullifying the advantages of the two-step oxidation. Accordingly, adiabatic operation of the secondary converter of a two converter system is quite satisfactory. By "adiabatic" I mean without special cooling means, it being understood that such radiation and conduction losses to the atmosphere as normally occur need not be avoided, in fact can not be wholly avoided.

In carrying out my invention I prefer to employ two separate converters so that the oxidation catalyst in the second converter will not be exposed to the radiant heat of the high temperature contact mass in the first or primary converter. The primary converter is arranged in the usual manner with suitable cooling means for maintaining the reacting mixture at the desired temperature. The secondary or scavenging converter preferably is arranged for passage of the mixture therethrough at a reduced space velocity and need not be provided with cooling means. In fact, it may be desirable in some cases to provide this converter with heat insulation to prevent changes in the reaction by varying atmospheric conditions or to prevent chilling and consequent quenching of the reaction in the vicinity of the converter walls. As explained above, the heat resulting from the oxidation of the small percentage of intermediate oxidation products is not sufficient to cause excessive rise of temperature.

The converters may contain any suitable oxidation catalysts or catalyst mixtures and the catalyst in the secondary converter is preferably the more active. The primary converter may contain, for example, a catalyst comprising 5 parts by weight of vanadium oxide ($V_2O_5$) disposed on 95 parts by weight of silica brick or alundum as carrier and the secondary converter may contain 10 parts by weight of vanadium oxide on 90 parts of the carrier or it may contain the same amount of catalyst but disposed on a carrier in more finely divided condition so as to present a greater surface area per unit of volume.

The accompanying drawing illustrates diagrammatically an arrangement of catalytic converters constituting one embodiment of my invention.

In the drawing the numeral 1 designates a converter of the usual type having a vapor inlet 2 and outlet 3. The reaction section comprises a chamber 4 containing a plurality of tubes 5. Chamber 4 is adapted to contain a cooling liquid, such as mercury, which surrounds tubes 5. The chamber communicates with coolers or condensers 6 and 6' arranged for refluxing mercury vapors to the body of liquid. This chamber is adapted for pressure regulation in order to maintain the boiling point of mercury at the desired reaction temperature in well-known manner. A perforated plate (or plates) 7 is provided at the bottom of the tubes 5 and is arranged to support a column of catalyst in each of the tubes 5.

Catalyst tubes 5 may be filled with catalyst of graded activity to provide maximum uniformity of reaction conditions. Thus three layers of catalyst, 5A, 5B, and 5C may be arranged in the tubes, layers 5A and 5C, composed of a relatively active catalyst as compared with 5B. Catalyst layer 5A is the initiating layer which serves to start the reaction at slow oxidation temperatures and to bring the reaction mixture to the optimum temperature. Catalyst layer 5B serves to continue the reaction but less actively than catalyst 5A, so as to avoid much further increase in temperature. Most of the naphthalene is oxidized in these layers. Catalyst 5C serves to oxidize remaining naphthalene, present in relatively low concentration and therefore requiring active catalyst.

Vapor outlet 3 from converter 1 may be provided with a sampling outlet 8 for determining the composition of the reaction gases leaving converter 1. Vapor outlet 3 leads through a cooler 9 to the top of a secondary converter 10. Cooler 9 may be any type of cooler employing air or any other suitable cooling medium for regulating the temperature of the vapor mixture entering converter 10. A constant temperature of this mixture is desirable to secure uniformity of reaction conditions in the secondary converter.

Converter 10 has an outlet 11 for the reaction mixture. It is provided with a plurality of perforated trays 12 and 13 for supporting catalyst 14. Cooling means (not shown) intermediate the trays may be provided but are not necessary. The catalyst mass in the converter 10 contains an amount of active catalyst such that if it were employed under the same conditions as the mass in converter 1, it would be capable of double the output of the latter.

In operation of this catalytic converter system, charged as above, a mixture of naphthalene vapor and air (or equivalent gas containing molecular oxygen) containing a large excess over the stoichiometric amount of air; e. g., about one part by weight of naphthalene for each 30 parts of air (representing a molar or volume ratio of about .75:100), preheated to between 250° and 380° C. is introduced through vapor inlet 2 to converter 1. The mixture, upon entering converter 1, is subjected to the radiant heat of the catalyst bed and its temperature is rapidly raised. Upon contact with the catalyst bed, the mixture immediately reacts to convert the naphthalene to naphthoquinone and thence to phthalic anhydride. The gases passing through the catalyst bed are cooled by means of the cooling fluid surrounding tubes 5 to dissipate heat of reaction and to maintain the maximum temperature between 450° and 550° C., the lower temperatures within this range being preferable for fresh catalyst and the higher for more nearly spent catalyst. The velocity of the naphthalene vapor-air mixture is controlled so that substantially all of the naphthalene in the mixture is oxidized but so that as soon as naphthalene has been eliminated the mixture at a temperature around 440° C. passes from the converter. The specific space velocity necessary for this purpose will vary depending upon the activity of the catalyst, the size of the granules of carrier upon which the catalyst is deposited, and other factors, as will be appreciated by those skilled in the art.

The gases and vapors leaving converter 1 will contain substantially no naphthalene, not more than about 0.5% of the total amount used, but in view of the fact that the reaction was halted as soon as naphthalene was eliminated and therefore insufficient reaction time was allowed for further oxidation of naphthoquinone and coumarin to phthalic anhydride, the gases will contain a small proportion of naphthoquinone, an amount equal to around 2% to 7% of the weight of naphthalene used, and a very small proportion of coumarin, an amount equal to about 0.1% of the naphthalene used.

The hot reaction mixture is passed through conduit 3 to cooler 9 to reduce its temperature to around 370° C. and is passed at this temperature into the top of secondary converter 10. In converter 10 the vapor mixture is contacted with the lower temperature catalyst masses 14 which, as previously indicated, should be of high activity. Because of the small quantity of materials to be oxidized to phthalic anhydride in this converter, the heat of reaction is relatively small and will be absorbed as sensible heat of the reaction gases with only a small rise of temperature. It is preferred that the converter be insulated in order to obtain uniformity of reaction conditions throughout. In this case the temperature of the gases may rise above 410° C. toward the end of the oxidation but this will be for only a brief period, the total proportion of the period during which the gases are above 410° C. being less than a quarter of the total period during which the gases are in contact with the catalyst in this converter. Preferably the converter 10 is of sufficient size so that the space velocity of the gases passing therethrough is reduced to about half that of the gases passing through the primary converter 1. The relatively long contact period, say .05 second, thus obtained, together with the more active catalyst, causes relatively complete oxidation of naphthoquinone and coumarin to phthalic anhydride so that the quantities of these lower oxidation products in the gases is reduced to practically nil.

The gases and vapors constituting the final oxidation product may be cooled to normal temperature or only partially cooled for condensation or sublimation of the phthalic anhydride from the gases. Maleic anhydride and any small amounts of naphthalene that may remain normally pass on with the gases.

By the above process high yields of phthalic anhydride, for instance 75 to 80 mols for each mol. of naphthalene are obtained substantially free from unreacted hydrocarbon and lower oxidation products. The phthalic anhydride product may contain traces of tarry matter and may be purified by distillation, the tarry matter remaining as distillation residue.

I claim:

1. In the catalytic oxidation of naphthalene to phthalic anhydride by passage of a mixture of naphthalene vapor and a gas containing molecular oxygen into contact with an oxidation catalyst in an oxidation zone at a temperature above 425° C., the improvement which comprises withdrawing reaction gases and vapors from said zone when substantially all of the naphthalene has been oxidized but a substantial quantity of naphthoquinone is still present, and passing the gases and vapors into contact with an oxidation catalyst in a second oxidation zone at a temperature between 350° and 410° C. for a sufficient period to oxidize the major part of said naphthoquinone.

2. In the catalytic oxidation of naphthalene to form phthalic anhydride by passage of a mixture of naphthalene vapor and a gas containing molecular oxygen into contact with an oxidation catalyst, the improvement which comprises passing a mixture of naphthalene vapor and an amount of said gas in excess of the stoichiometric amount to form phthalic anhydride into contact with a catalyst in an oxidation zone maintained at a temperature within the range 425°

C. to 550° C. until substantially all of the naphthalene is oxidized but the resultant gases yet contain residual naphthoquinone, promptly withdrawing reaction gases and vapors from said zone, cooling them to a temperature within the range 350° C. to 410° C. and passing them into contact with a catalyst in a second oxidation zone maintained within this temperature range to oxidize the residual naphthoquinone to phthalic anhydride.

3. In the catalytic oxidation of naphthalene to phthalic anhydride by passage of a mixture of naphthalene vapor and a gas containing molecular oxygen into contact with an oxidation catalyst in an oxidation zone at a temperature above 425° C., the improvement which comprises oxidizing a major part of the naphthalene to phthalic anhydride and residual naphthoquinone at a temperature between 450° and 550° C. and oxidizing the major part of said residual naphthoquinone to phthalic anhydride at a temperature between 370° and 410° C.

4. In the catalytic oxidation of naphthalene to form phthalic anhydride by passage of a mixture of naphthalene vapor and a gas containing molecular oxygen into contact with a vanadium oxide catalyst, the improvement which comprises passing a mixture of naphthalene vapor and an amount of said gas in excess of the stoichiometric amount to form phthalic anhydride into contact with a catalyst in an oxidation zone maintained at a temperature within the range 425° C. to 550° C. until substantially all of the naphthalene is oxidized but the resultant gases yet contain residual naphthoquinone, promptly withdrawing reaction gases and vapors from said zone, cooling them to a temperature within the range 350° C. to 410° C. and passing them into contact with a catalyst in a second oxidation zone maintained within this temperature range and having a total catalytic effectiveness at least as great as that of the total catalyst in the first oxidation zone, to oxidize the residual naphthoquinone to phthalic anhydride.

5. In the catalytic oxidation of naphthalene to form phthalic anhydride by passage of a mixture of naphthalene vapor and a gas containing molecular oxygen into contact with an oxidation catalyst, the improvement which comprises passing a mixture of naphthalene vapor and an amount of said gas in excess of the stoichiometric amount to form phthalic anhydride into contact with a catalyst in an oxidation zone maintained at a temperature within the range 425° C. to 550° C. until substantially all of the naphthalene is oxidized but the resultant gases yet contain residual naphthoquinone, promptly withdrawing reaction gases and vapors from said zone, cooling them to a temperature within the range 350° C. to 410° C. and passing them into contact with a catalyst in a second oxidation zone maintained within this temperature range to oxidize the residual naphthoquinone to phthalic anhydride and controlling the reaction so that not more than one quarter of the residual naphthoquinone oxidation takes place at a temperature above 410° C.

6. In the catalytic oxidation of naphthalene to phthalic anhydride by passage of a mixture of naphthalene vapor and air in a weight ratio of about 1 part naphthalene to 30 parts air into contact with a vanadium oxide catalyst in an oxidation zone at a temperature above 425° C., the improvement which comprises withdrawing reaction gases and vapors from said zone when substantially all of the naphthalene has been oxidized but a substantial quantity of naphthoquinone is still present, and passing the gases and vapors into contact with an oxidation catalyst in a second oxidation zone at a temperature between 350° and 410° C. and having a total catalytic effectiveness at least as great as that of the total catalyst in the first oxidation zone.

7. In the catalytic oxidation of naphthalene to phthalic anhydride by passage of a mixture of naphthalene vapor and air in a weight ratio of about 1 part naphthalene to 30 parts air into contact with an oxidation catalyst, the improvement which comprises passing said mixture into contact with a catalyst in an oxidation zone maintained at a temperature within the range 425° C. to 550° C. by indirect heat exchange until substantially all of the naphthalene is oxidized but the resultant gases yet contain residual naphthoquinone, promptly withdrawing reaction gases and vapors from said zone, cooling them to a temperature within the range 350° C. to 410° C. and passing them into contact with a catalyst in an adiabatic oxidation zone, and controlling the cooling intermediate said oxidation zones to prevent a rise of temperature above 450° C. in said adiabatic oxidation zone and to maintain the temperature of said zone below 410° C. for at least 75% of the period of sojourn of reaction gases and vapors therein.

8. In the catalytic oxidation of naphthalene to phthalic anhydride by passage of a mixture of naphthalene vapor and a gas containing molecular oxygen into contact with an oxidation catalyst in an oxidation zone at a temperature above 425° C., the improvement which comprises controlling the temperature and time of contact of the mixture with catalyst so that at least 80% of the naphthalene is oxidized to phthalic anhydride and residual naphthoquinone at a temperature between 450° and 550° C., and subjecting the resulting mixture containing residual naphthoquinone to catalytic oxidation at a temperature below 450° C. and controlling the temperature and contact period so that at least 80% of the oxidation of residual naphthoquinone to phthalic anhydride is effected at a temperature between 370° and 410° C.

FRANK PORTER.